Jan. 22, 1957 D. J. CESARE 2,778,325
PATTY MAKING IMPLEMENT
Filed March 30, 1955

INVENTOR.
Dominec J. Cesare
BY
Leonard H. Knupfer
Attorney

United States Patent Office 2,778,325
Patented Jan. 22, 1957

2,778,325
PATTY MAKING IMPLEMENT
Dominec J. Cesare, Chicago, Ill.
Application March 30, 1955, Serial No. 497,994
3 Claims. (Cl. 107—47)

This invention relates to an implement for cutting and forming comestibles in the nature of patties which include a casing of bread or dough enclosing a filling of chopped meat, cheese, etc.

In the making of patties of this class the procedure customarily includes the preparation of two sheets of dough, the spreading or mound-like distribution upon one sheet of a desired filling of meet, cheese, jelly and so forth, the placement of the second sheet of dough over the layer or mounds of filler and the cutting and crimping of the individual patties. In my United States Patent No. 2,665,649 I have disclosed one form of device for facilitating the cutting and crimping of the patties which includes a cutter of appropriate contour surrounding a die arranged to crimp the cut margins of the patty and including means for altering the depthwise relationship between the crimping face and the active edge of the cutter. However, the means there shown has since been found not too well adapted to a kitchen implement as the same is comparatively expensive and incorporates interstices in which food remains may lodge and which are difficult to clean.

The instant invention contemplates improvements in patty formers of the type just noted, namely, in which adjustment between the active cutting edge and the crimping face may be quickly effected, the parts separated for ease in cleaning and the same simplified substantially to reduce manufacturing cost.

Meat patties, e. g. ravioli, generally utilize a pastry or dough which, in the uncooked state, has a thickness for the upper and lower pieces of pastry combined of say 1/16″, whereas a filled party sandwich made from two superimposed slices of bread having a filling therebetween, cut to desired outline and crimped for toasting, may be approximately 3/16″ in overall depth following cutting and crimping. In my improved device I therefore arrange the cutter with respect to the crimping die in such manner that each of these two extremes of effective spacing between the work surface, namely, the lower surface of the patty and the crimpled face, may be quickly obtained.

Broadly regarded, the invention comprehends the provision of a shell including a sharpened, vertically-extended wall for cutting the patty to appropriate contour within which there is frictionally carried a detachably securable crimping die. By means of interrelated notches and protuberances on the die and cutter, either of two relative positions thereof may be rapidly achieved manually to vary the vertical relationship between the working face of the die and the cutting edge. A handle is secured to the cutter portion.

One preferred form of the invention is shown in the accompanying drawing in which.

Figure 1:
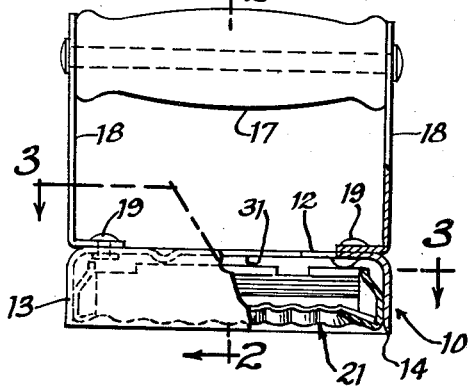
Fig. 1 is a view, partly in section, showing an implement in accordance with the invention.

Turning now to the drawing, there is shown a shell-like cutter portion 10 of metal or plastic composition comprising an upper, horizontal wall 12 and a vertical continuous side wall 13 of any desired outline, such as rectangular with rounded corners, corresponding to the desired shape of patty to be cut thereby. The lower edge 14 is sharpened for severing the individual patty from the mass. The upper wall 12 may be interrupted centrally to provide an aperture 16 through which the mound defining the filling of the patty may clear when compressed by the crimping operation. A handle 17 of any convenient form is secured to the cutter 10 by straps 18—18 and rivets 19—19.

Figure 5:
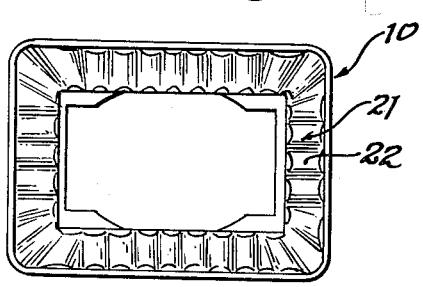
Fig. 5 is a bottom plan view with the crimping die in operative position.
Figure 6:
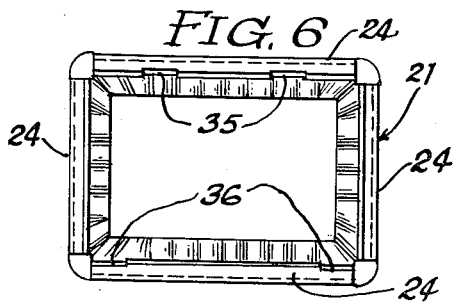
Fig. 6 is a detail in top plan of the die portion only.

The crimping die 21 (Figs. 5 and 6) comprises an active face 22 which may be provided with any desired surface embossment, such as corrugations, to ornament the finished product or it may be flat. In any case the face 22 is preferably sloped upwardly and inwardly in order to squeeze filling which may lie adjacent the margin of the patty toward the center. By such action, sealing of the upper and lower pieces of dough is not inhibited by the interposition of the filling. It will be noted that the active face 22 may be of only relatively narrow scope sufficient to seal the patty at the margins and to leave unaffected the filler surrounded thereby.

Figure 2:
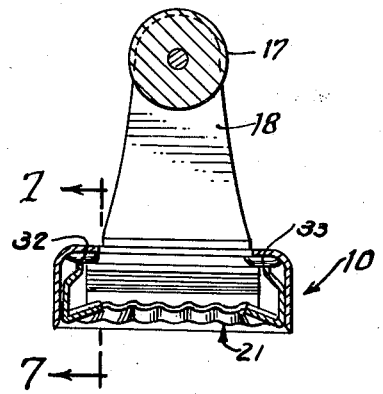
Fig. 2 is a cross section taken on the line 2—2 of Fig. 1.
Figure 3:
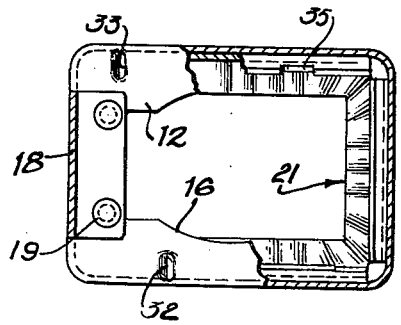
Fig. 3 is a cross section taken on the line 3—3 of Fig. 1.

Engagement of the die portion 21 with the cutter 10 is of simple frictional character and is accomplished by providing wall portions 24 so dimensioned and tensioned as to fit snugly within the wall 13 (Figs. 1 and 2) to maintain working relation therewith and yet capable of being dislodged by the fingers when adjustment is desired. The means for effecting such adjustment will now be described.

Figure 4:
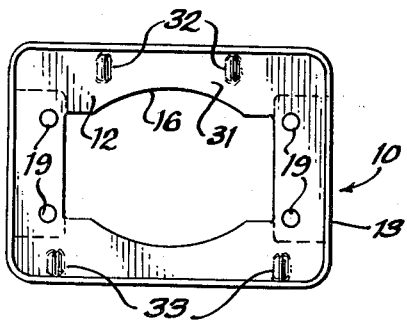
Fig. 4 is a bottom plan view with the crimping die removed.
Figure 7:
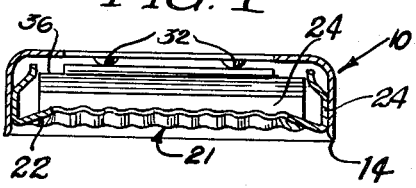
Fig. 7 is a cross section taken on the line 7—7 of Fig. 2 to show the die portion in its lower position.
Figure 8:
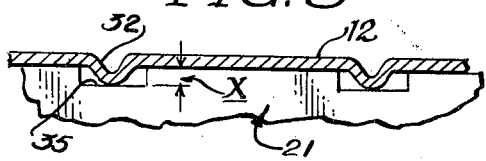
Fig. 8 is an enlarged detail to show the interrelated notches and protuberances regulating the adjustment.

On the lower surface 31 (Fig. 4) of the upper wall 12 and above the wall portions 24 of the die there are provided two sets of protuberances 32—32 and 33—33 which, in the case of a sheet metal part, may be suitably struck out. The spacing of the members of one pair, e. g. the pair 32, is closer than that of the other pair 33. The upper margin of the corresponding wall portions 24 (Fig. 6) is notched as at 35—35 and 36—36, the members of each pair being spaced apart to the same extent as the respective pairs of protuberances 32—32 and 33—33. Thus, when the die and cutter are assembled with the protuberances 32—32 and notches 35—35 in register these, as well as protuberances 33—33 and notches 36—36, will interfit (Fig. 8) and the face 22 of the die will occupy a specific relation depthwise with respect to the cutting edge 14 whereas, when the die is assembled reversely, namely by withdrawing the die, rotating the same 180° in its own plane and reinserting the same, the protuberances 32—32 will abut the upper edge of the respective wall portion 24 (Fig. 7) and similarly for the protuberances 33—33. Accordingly, the distance from the face 22 to the cutting edge 14 will be decreased by the dimension X (Fig. 8).

From the foregoing it will have become apparent that I have provided an implement for the purpose described which combines two parts easily assembled and disassembled for cleaning and is capable of assuming either of two adjusted positions with simple manipulation.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. An implement for cutting and forming patties from two pieces of superimposed dough or the like enclosing a desired filling substance comprising: a parallelepipedic shell including a horizontal top wall and a continuous vertical wall defining an open bottom, the lower rectangular edge of said vertical wall being sharpened for cutting the dough, a die member having a vertical wall coextensive with and complemental to said vertical shell wall frictionally engaged therewithin to maintain operative relation of said shell and die member but to allow manual withdrawal from and reinsertion into said shell through the open bottom, said die member having a pressing face spaced upwardly from said sharpened edge for sealing the margin of the cut patty substantially concurrently with the cutting action, and means for altering the spacing of said pressing face and cutting edge including means defining a notch in the upper margin of the die member vertical wall and a protuberance for interfit with said notch on the lower surface of said horizontal top wall, said notch and protuberance being adapted for interfit in only one relative position of the die member and shell and adapted to interfere in the reversed relative position of the die member and shell which results from withdrawing the die member from said interfitting position, rotating the same 180° in its plane and reinserting the same in the shell.

2. An implement for cutting and forming patties from two pieces of superimposed dough or the like enclosing a desired filling substance comprising: a parallelepipedic shell including a horizontal top wall and a continuous vertical wall defining an open bottom, the lower rectangular edge of said vertical wall being sharpened for cutting the dough, a die member having a vertical wall coextensive with and complemental to said vertical shell wall frictionally engaged therewithin to maintain operative relation of said shell and die member but to allow manual withdrawal from and reinsertion into said shell through the open bottom, said die member having a pressing face spaced upwardly from said sharpened edge for sealing the margin of the cut patty substantially concurrently with the cutting action, and means for altering the spacing of said pressing face and cutting edge including means defining a notch in the upper margin of each of a pair of opposite sections of the die member vertical wall and a protuberance for interfit with each said notch on the lower surface of said horizontal top wall, said notches and protuberances being adapted for interfit in only one relative position of the die member and shell and adapted to interfere in the reversed relative position of the die member and shell which results from withdrawing the die member from said interfitting position, rotating the same 180° in its plane and reinserting the same in the shell.

3. An implement for cutting and forming patties from two pieces of superimposed dough or the like enclosing a desired filling substance comprising: a parallelepipedic shell including a horizontal top wall and a continuous vertical wall defining an open bottom, the lower rectangular edge of said vertical wall being sharpened for cutting the dough, a die member having a vertical wall coextensive with and complemental to said vertical shell wall frictionally engaged therewithin to maintain operative relation of said shell and die member but to allow manual withdrawal from and reinsertion into said shell through the open bottom, said die member having a pressing face spaced upwardly from said sharpened edge for sealing the margin of the cut patty substantially concurrently with the cutting action, and means for altering the spacing of said pressing face and cutting edge including means defining a pair of notches in the upper margin of one side of the die member vertical wall and a pair of notches in the opposite side thereof, the spacing of one pair being different than the spacing of the other pair, a pair of protuberances on the lower surface of said horizontal top wall for interfit with one pair of said notches and a pair of protuberances also on the lower surface of said top wall for interfit with the other pair of said notches whereby in one relative position of the die member and shell the respective pairs of protuberances interfit their respective pairs of notches for one predetermined spacing of the pressing face with the cutting edge and in the reversed position of the die member and shell which results from withdrawing the die member from said interfitting position, rotating the same 180° in its plane and reinserting the same in the shell said pairs of notches do not register with said protuberances thereby effecting a different predetermined spacing between the pressing face and the cutting edge.

References Cited in the file of this patent
UNITED STATES PATENTS

| 2,214,475 | Napolillo | Sept. 10, 1940 |
| 2,653,746 | MacDonald | Sept. 29, 1953 |
| 2,665,649 | Cesare | Jan. 12, 1954 |